(12) United States Patent
D'Alvia

(10) Patent No.: US 6,915,986 B2
(45) Date of Patent: Jul. 12, 2005

(54) COCKPIT ACCESS PROTECTION SYSTEM

(76) Inventor: Graham R. D'Alvia, 1944 DeArmon Dr., Charlotte, NC (US) 28205

( * ) Notice: Subject to any disclaimer, the term of this patent is extended or adjusted under 35 U.S.C. 154(b) by 0 days.

(21) Appl. No.: 10/899,655

(22) Filed: Jul. 27, 2004

(65) Prior Publication Data

US 2005/0082429 A1  Apr. 21, 2005

Related U.S. Application Data

(63) Continuation-in-part of application No. 10/299,136, filed on Nov. 19, 2002, now Pat. No. 6,766,983.

(51) Int. Cl.[7] .................................... B64D 11/00
(52) U.S. Cl. ........................................ 244/118.5
(58) Field of Search .................... 244/118.1, 118.2, 244/118.5, 118.6; 109/2, 3, 6, 7

(56) References Cited

U.S. PATENT DOCUMENTS

| | | | | |
|---|---|---|---|---|
| 3,658,277 A | * | 4/1972 | Anderson | 244/1 R |
| 3,704,845 A | * | 12/1972 | Ord | 244/121 |
| 4,112,818 A | * | 9/1978 | Garehime, Jr. | 89/41.05 |
| 4,122,783 A | * | 10/1978 | Pretini | 109/3 |
| 4,741,275 A | * | 5/1988 | Lewiner et al. | 109/6 |
| 4,994,722 A | * | 2/1991 | Dolan et al. | 318/480 |
| 5,479,162 A | * | 12/1995 | Barger et al. | 340/945 |
| 5,694,867 A | * | 12/1997 | Diaz-Lopez | 109/6 |
| 5,701,828 A | * | 12/1997 | Benore et al. | 109/56 |
| 6,158,692 A | * | 12/2000 | Abild et al. | 244/129.5 |
| 6,308,644 B1 | * | 10/2001 | Diaz | 109/6 |
| 6,427,944 B1 | * | 8/2002 | Passman | 244/118.1 |
| 6,474,599 B1 | * | 11/2002 | Stomski | 244/118.5 |
| 6,499,693 B1 | * | 12/2002 | Rogson | 244/118.5 |
| 6,601,797 B2 | * | 8/2003 | Sheremeta | 244/118.5 |
| 6,669,144 B2 | * | 12/2003 | Artsiely | 244/129.5 |
| 6,688,555 B1 | * | 2/2004 | Kneisl | 244/118.5 |
| 6,696,979 B2 | * | 2/2004 | Manten et al. | 340/945 |
| 6,702,231 B2 | * | 3/2004 | Ward | 244/118.5 |
| 6,766,983 B2 | * | 7/2004 | D'Alvia | 244/118.5 |
| 6,769,646 B1 | * | 8/2004 | Komiyama | 244/118.5 |
| 6,771,186 B1 | * | 8/2004 | Boveja et al. | 340/945 |
| 6,793,179 B2 | * | 9/2004 | Daniels | 244/118.5 |
| 6,810,310 B1 | * | 10/2004 | McBain | 701/3 |
| 6,816,087 B2 | * | 11/2004 | Lane | 340/945 |
| 2002/0092951 A1 | * | 7/2002 | Haviv | 244/118.5 |
| 2002/0158166 A1 | * | 10/2002 | Lin | 244/118.5 |
| 2003/0006342 A1 | * | 1/2003 | Page | 244/118.5 |
| 2003/0052225 A1 | * | 3/2003 | Butzlaff | 244/118.5 |
| 2003/0052227 A1 | * | 3/2003 | Pittman | 244/118.5 |
| 2003/0052798 A1 | * | 3/2003 | Hanson | 340/945 |

(Continued)

Primary Examiner—Teri Pham Luu
Assistant Examiner—Stephen A Holzen
(74) Attorney, Agent, or Firm—Milde & Hoffberg, LLP

(57) ABSTRACT

The cockpit access protection system relies on a method whereby the locked cockpit doors of a plurality of aircraft may be unlocked only by authorized personnel within the cockpit (e.g., the pilot and copilot). In the event of a security breach in any one aircraft, the control of the cockpit doors of all aircraft shift to a ground control center which commands all cockpit doors to remain locked until the security breach is removed. In this way, neither flight attendant personnel within the aircraft cabin nor the pilot or copilot within the cockpit can be forced to unlock the cockpit door.

16 Claims, 6 Drawing Sheets

U.S. PATENT DOCUMENTS

| | | | |
|---|---|---|---|
| 2003/0062446 A1 * | 4/2003 | Arias | 244/118.5 |
| 2003/0062447 A1 * | 4/2003 | Cordina et al. | 244/118.5 |
| 2003/0066931 A1 * | 4/2003 | Ward | 244/118.5 |
| 2003/0071743 A1 * | 4/2003 | Seah et al. | 340/945 |
| 2003/0094541 A1 * | 5/2003 | Zeineh | 244/118.5 |
| 2003/0136878 A1 * | 7/2003 | Watson | 244/118.5 |
| 2003/0146347 A1 * | 8/2003 | Roessner et al. | 244/129.5 |
| 2003/0169184 A1 * | 9/2003 | Manten et al. | 340/945 |
| 2003/0173458 A1 * | 9/2003 | Bandy et al. | 244/118.5 |
| 2003/0201365 A1 * | 10/2003 | Nelson | 244/118.5 |
| 2003/0214418 A1 * | 11/2003 | Hahne et al. | 340/825.69 |
| 2004/0021036 A1 * | 2/2004 | Kneisl | 244/118.5 |
| 2004/0051001 A1 * | 3/2004 | Daniels | 244/118.5 |
| 2004/0079837 A1 * | 4/2004 | Nelson | 244/118.5 |
| 2004/0094667 A1 * | 5/2004 | D'Alvia | 244/118.5 |
| 2004/0149859 A1 * | 8/2004 | Komiyama | 244/118.5 |
| 2004/0188565 A1 * | 9/2004 | Egeresi | 244/118.5 |
| 2004/0188566 A1 * | 9/2004 | Kneisl | 244/118.5 |
| 2004/0251384 A1 * | 12/2004 | Sprenger | 244/118.5 |
| 2005/0006528 A1 * | 1/2005 | Movsesian et al. | 244/129.5 |

* cited by examiner

GROUND ("GND")  AIRCRAFT ("A/C")
PRE-FLIGHT
AIRPORT

| GROUND | AIRCRAFT |
|---|---|
| STORE INFO | FLIGHT CREW LOGS ON AND ENTERS PERSONAL ID'S- ID'S TRANSMITTED TO GND |
| STORE INFO AND ACTIVATE CAPS FOR THIS A/C | FLIGHT CREW CLOSES AND LOCKS MAIN CABIN DOOR; TRANSMIT LOCKED STATUS OF MAIN CABIN DOOR TO GND |
| CREATE AND TRANSMIT TO A/C UNIQUE ALPHA CODE | STORE ALPHA CODE AND ACTIVATE CAPS ON A/C |
| STORE INFO | PILOT AND CO-PILOT CLOSE COCKPIT DOOR AND IT LOCKS AUTOMATICALLY; TRANSMIT LOCKED DOOR TO GND |

FIG. 4A

GROUND                                              AIRCRAFT ("A/C")

NORMAL SECURITY

AIRBORNE

| | |
|---|---|
| | FLIGHT CREW CLEARS GALLEY AREA OF PASSENGERS |
| | FLIGHT CREW CLOSES GALLEY DOOR AND IT LOCKS AUTOMATICALLY; PILOT NOTES GALLEY DOOR LOCKED STATUS |
| | PILOT UNLOCKS COCKPIT DOOR AND ENTERS GALLEY AREA |
| | COCKPIT DOOR IS CLOSED AND IT LOCKS AGAIN AUTOMATICALLY; PILOT ATTENDS TO PERSONAL BUSINESS AND THEN KNOCKS ON COCKPIT DOOR |
| | CO-PILOT VIEWS GALLEY AREA |
| | CO-PILOT UNLOCKS COCKPIT DOOR AND ALLOWS PILOT TO REENTER |
| | PILOT CLOSES COCKPIT DOOR AND IT LOCKS AUTOMATICALLY; PILOT OR FLIGHT CREW UNLOCK GALLEY DOOR |
| | REPEAT AS NECESSARY |

FIG. 4B

GROUND　　　　　　　　　　　　　　AIRCRAFT ("A/C")

MEDICAL EMERGENCY

AIRBORNE

| | |
|---|---|
| | FLIGHT CREW CLEARS GALLEY AREA OF PASSENGERS |
| | FLIGHT CREW CLOSES GALLEY DOOR FROM INSIDE |
| | FLIGHT CREW CALLS GND BY VOICE RADIO |
| GND CHECKS PERSONAL ID'S; GND DEEMS THERE IS NO BREACH OF SECURITY | FLIGHT CREW INFORMS GND OF PERSONAL ID'S AND NATURE OF EMERGENCY |
| GND INFORMS FLIGHT CREW OF ALPHA CODE | FLIGHT CREW ENTERS ALPHA CODE IN KEYBOARD IN GALLEY |
| | COCKPIT DOOR IS UNLOCKED AND FLIGHT CREW ENTER COCKPIT |

FIG. 4C

| GROUND | AIRCRAFT ("A/C") |

SECURITY BREACH ("SB")

AIRBORNE

| GROUND | AIRCRAFT ("A/C") |
|---|---|
| GND CONTROL DISCOVERS SB | FLIGHT CREW, PILOT OR CO-PILOT DISCOVER SB |
| TRANSMIT SB ALERT TO A/C | TRANSMIT SB ALERT TO GND |
| STORE INFO | TRANSMIT LIVE VIDEO, DOOR SENSOR INFO AND FLIGHT RECORDER INFO TO GND |
| | STORE NEW ALPHA CODE |
| TRANSMIT COMMAND TO SECURE LOCKS ON MAIN CABIN DOOR AND COCKPIT DOOR ON ALL CAPS ACTIVATED A/C | MAIN CABIN DOOR AND COCKPIT DOOR CANNOT BE UNLOCKED BY ANYONE ON A/C |
| UNTIL ALERT IS CLEARED THE MAIN CABIN DOOR AND COCKPIT DOOR AN ALL CAPS A/C REMAIN LOCKED BY GND | LAND A/C |

AIRPORT

| GROUND | AIRCRAFT ("A/C") |
|---|---|
| TRANSMIT COMMAND TO UNLOCK MAIN CABIN DOOR | UNLOCK MAIN CABIN DOOR; ALLEVIATE SB |
| TRANSMIT COMMAND TO UNLOCK COCKPIT DOOR | UNLOCK COCKPIT DOOR; PILOT AND CO-PILOT CAN LEAVE A/C |

FIG. 4D

COCKPIT ACCESS PROTECTION SYSTEM

CROSS-REFERENCE TO RELATED APPLICATION

This application is a continuation-in-part of application Ser. No. 10/299,136, filed Nov. 19, 2002, entitled "COCKPIT ACCESS PROTECTION SYSTEM", now U.S. Pat. No. 6,766,983, issued Jul. 27, 2004.

FIELD OF THE INVENTION

The invention relates to a system for preventing unauthorized access to airplane cockpits.

BACKGROUND OF THE INVENTION

Safety of airplane crew and passengers often depends on preventing unauthorized access to the airplane cockpit. Presently, only a weak cockpit door separates the cockpit from the remainder of the aircraft. Preventing unauthorized personnel from gaining control of the cockpit prevents control of the aircraft from being turned over to unauthorized personnel.

The prior art discloses several methods for preventing unauthorized access to the cockpit. U.S. Pat. No. 6,308,644 (Diaz) discloses a control chamber security system having first and second doors defining an access control vestibule. Magnetic locks are provided on the doors and are controlled by a control panel. A video camera monitors the vestibule.

U.S. Pat. No. 5,701,828 (Benore et al.) discloses an electronic security system having a lock system controlling access to a plurality of enclosures. The lock mechanism has a specific access code allowing opening and closing of the locks on the door to each enclosure.

U.S. Pat. No. 3,704,845 (Ord) discloses an airplane hijacking prevention system preventing access to a cockpit by a bullet proof door which can be opened only from the cockpit. No means are provided for opening this door in the event of an emergency in the cockpit, such as ill health of the pilot or fire in the cockpit, which makes it impossible to open the cockpit door from the inside.

The Patent Publication No. US 2003/0071743 (Seah et al.) discloses an aircraft having a double door module that forms a cockpit door and galley door. While in the air, the aircraft maintains a secure communication link with an "incident management center" on the ground which transmits commands to the aircraft's onboard computer system for carrying out countermeasures after a threat to the aircraft has been discovered, and an alert mode has been activated, either by the pilot or by the ground control. One of the countermeasures is to lock the cockpit door; that is, the front door of the double door module.

However, no means are provided for preventing the cockpit door from being opened by the pilot or copilot in other aircraft in flight in the event of a security breach in one aircraft.

The U.S. Patent Publication No. US 2003/0052227 (Pittman) discloses a double door module for aircraft, in this case suitable for retrofitting an existing aircraft. Both the cockpit and the galley doors have an automatic lock/release deadbolt mechanism that is openable by the flight crew upon entry of an alphanumeric code in a touch pad, iris scan of the eyeball or fingerprint scan. The alphanumeric code is permanently built into the door lock and cannot be changed by a ground control center.

The U.S. Pat. No. 6,474,599 (Stomski) also discloses a double door arrangement for an aircraft which allows the pilot to enter the galley area during flight when the galley door is closed. However, in the case of a security breach in one aircraft, a ground control center has no ability to lock the cockpit door in other aircraft nor is it possible to unlock the cockpit door in the case of an emergency in the cockpit.

Finally, the Patent Publication No. US 2003/0052798 (Hansoh) discloses an airplane anti-hijack system which sends informational signals, such as audio, video and sensor information as well as flight recorder information to a ground control center to provide real time information to the control center. The control center, in turn, can send informational signals to the aircraft to perform various on board operations, such as dumping fuel, taking over flight control and flying the airplane by remote control. Hanson makes no mention of controlling a cockpit door lock by remote control in the event of a security breach.

SUMMARY OF THE INVENTION

A principal objective of the present invention is to provide a method for preventing unauthorized access to the cockpit of an aircraft in flight so that hijackers and/or other unauthorized personnel cannot take control of the aircraft.

A further objective of the present invention is to provide a method which secures the cockpits of a plurality of aircraft in flight, in the event of a security breach in one of the aircraft.

These objectives, as well as further objectives which will become apparent from the discussion that follows, are achieved, in accordance with the invention, by a method whereby the locked cockpit doors of a plurality of aircraft may be unlocked only by authorized personnel within the cockpit (e.g., the pilot and copilot), unless there is a cockpit emergency. In the event of a security breach in any one aircraft, the control of the cockpit doors of all aircraft shift to a ground control center which commands all cockpit doors to remain locked until the security breach is removed. In this way, neither flight attendant personnel within the aircraft cabin nor the pilot or copilot within the cockpit can be forced to unlock the cockpit door.

More particularly, the method according to the present invention is applicable to secure a plurality of aircraft in flight, wherein each aircraft has a fuselage cabin with a cockpit, a galley area adjacent to the cockpit, a main cabin door to the outside, a cockpit door and a galley door, separating the cockpit and galley respectively from the remaining portion of the cabin. The method comprises the steps of:

(a) prior to flight of an aircraft, allowing authorized persons to enter the cockpit;

(b) prior to or during flight of the aircraft, closing and locking the cockpit door to prevent access to the cockpit by unauthorized personnel from the remaining portion of the aircraft cabin;

(c) during flight of the aircraft, removing unauthorized personnel from the galley area;

(d) thereafter closing and locking the galley door to prevent access to the galley by unauthorized personnel from the remaining portion of the aircraft cabin;

(e) thereafter unlocking the cockpit door and allowing authorized personnel into the galley area from the cockpit;

(f) thereafter viewing the galley area for unauthorized personnel;

(g) thereafter unlocking the cockpit door and allowing authorized personnel to reenter said cockpit;

(h) thereafter closing and locking the cockpit door to prevent access to the cockpit by unauthorized personnel;

(i) thereafter unlocking the galley door and allowing unauthorized personnel into the galley area;

(j) repeating steps (c)–(i) as often as necessary;

(k) in the event of a security breach on the aircraft, transmitting an alert between a ground control center and the aircraft; and (l) transmitting a command from the control center to each of the plurality of aircraft to prevent unlocking of the cockpit door of each aircraft.

According to a preferred feature of the present invention, the cockpit door and the galley door both include a sensor which indicates when the respective door is closed and locked. The output of these sensors are supplied to a network node for communicating with the ground control center so that, in the event of a security breach, the locked status of the cockpit door and/or galley door may be transmitted to the control center.

According to another preferred feature of the present invention, prior to the flight of each aircraft, the ground control center transmits an alphanumeric code to the aircraft. This alphanumeric code may be used by authorized flight personnel on the aircraft to permit them to enter the cockpit from the galley area in the case of a cockpit emergency; that is, when the pilot and/or copilot are unable to unlock the cockpit door from the inside for any reason. Such an emergency may be a medical emergency, a fire in the cockpit, or the like.

In the event of such an emergency, the authorized flight personnel first verify their identity with the ground control center which then informs them of the alphanumeric code. The flight personnel may enter this alphanumeric code into a keyboard or the like in the galley area to unlock the cockpit door.

To prevent use of this alphanumeric code by unauthorized personnel, the alphanumeric codes transmitted to all of the plurality of aircraft in flight are changed by the control center in the event of a security breach in one of the aircraft.

When verifying the identity of the flight personnel, for the purposes of informing them of the alphanumeric code, preferably voice communication is used between the control center and the flight personnel. During this voice communication, the flight personnel may inform the control center of their personal identification information, previously reported to the control center at the commencement of the flight, and also may verify that no security breach exists.

According to still another preferred feature of the present invention, certain measures are taken with respect to one or more of the aircraft in flight upon reporting a security breach in one of the aircraft. In this event, a live video signal, from one or more video cameras in the cabin, is transmitted to the control center. In addition, the status of the cockpit door and galley door (whether closed and/or locked) is transmitted to the control center. And finally, the information which is stored on the flight recorder of the aircraft is transmitted to the control center.

For a full understanding of the present invention, reference should now be made to the following detailed description of the preferred embodiments of the invention as illustrated in the accompanying drawings.

BRIEF DESCRIPTION OF THE DRAWINGS

FIG. 4, comprised of FIGS. 4A–4D, is a flow-chart describing the sequence of events which occur in the security system according to the present invention.

DETAILED DESCRIPTION OF THE INVENTION

Figure 1:
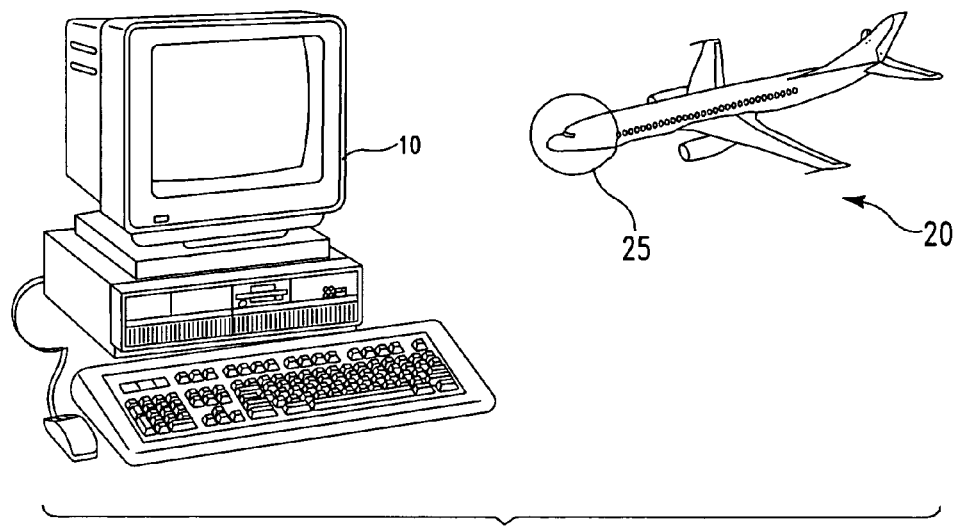
FIG. 1 is a representational diagram showing various components of the invention.

The preferred embodiments of the present invention will now be described with reference to FIGS. 1–4 of the drawings. Identical elements in the various figures are designated with the same reference numerals.

With reference to FIG. 1, a remote computer 10 is depicted. This remote computer is located on the ground, preferably in a highly secure area of FAA ground control. The remote computer communicates with the cockpit access protection system (CAPS) on an aircraft 20. The remote computer generates a concealed alphanumeric pass code unique for each aircraft. This code is communicated to authorize flight personnel to unlock the cockpit door in case of an emergency. A new code is generated for every flight when CAPS is activated and changes immediately upon a security breach on any other aircraft utilizing CAPS.

Figure 2:
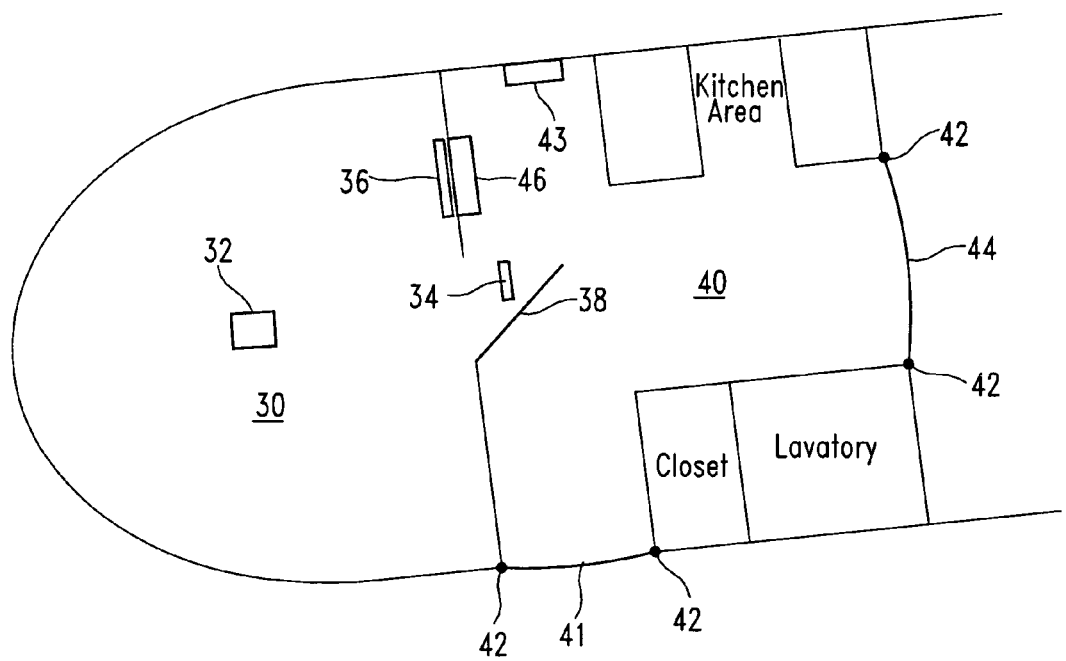
FIG. 2 is a diagram showing the components of the invention within an aircraft cockpit and galley.

In the event of a security breach, the remote computer scrambles all pass codes for activated aircraft and sends a signal to the system aboard the aircraft experiencing the security breach to lock the cockpit door. Pilots on the aircraft experiencing the security breach cannot open the cockpit until ground control determines that it is safe to do so, or upon deactivation of CAPS. The CAP system is located in the forward section 25 o the aircraft. The components comprising the CAP system are shown in FIG. 2. The forward end of the cockpit 25 is made from the cockpit 30 and galley area 40. A network node 36 is located within the cockpit 30. The node communicates with and receives instructions from the remote computer located on the ground. The network node also receives the concealed alphanumeric pass code from the remote computer.

A reinforced cockpit 38 separates the cockpit 30 from the galley area 40. Also, a galley door 44 having a locked/unlocked indicator light separates the galley area 40 from the passenger seating area. A main cabin door 41 provides an entrance and exit way between the galley and the exterior of the aircraft.

Sensors 42 are located on the main cabin door 41 and the galley door 44. The sensors on the main cabin door send the signal to the remote computer to activate CAPS when closed before departure and to deactivate CAPS upon arrival. The sensors on the galley door sends signals to the network node indicating whether the galley door is opened or closed. The galley door 44 prevents access from the passenger area and allows the cockpit crew to use the facilities in the galley. When the cockpit door is open, the galley door remains closed and locked. The unlocked/locked indicator light shows crew members when the galley door is locked or unlocked.

A keypad 46 having a CAPS light is located on the bulkhead of the galley next to the cockpit door 38. The indicator light shows crew members when CAPS is activated or deactivated. The keypad is used by the flight crew to log on to the flight by entering individual social security numbers or other identification numbers. The keypad unlocks the cockpit door in case of a pilot or medical emergency or other hazardous situation as will be described later. A two-way radio 48 is also located in the galley. The two-way radio is installed near the keypad and is used for voice communication between the aircraft and ground control.

A camera 34 connected to monitor 32 within the cockpit allows pilots to view events occurring outside the cockpit to visually determine if any potential safety issues exist. During a security breach, the camera records and sends a live video feed to a monitor at ground control.

With the components of the system described, the operation of the system will now be detailed.

After loading of the passengers and before departure of the flight, the CAPS is activated. Upon entering the aircraft, the flight personnel log on to the flight by entering an identification number, such as a social security number or an employee ID on the keypad. The information is sent to the central processor unit for the specific airline. The numbers entered by the flight crew are verified against the personnel scheduled to work that particular flight. The flight captain completes the standard departure checklist and the main cabin door is closed. The sensor on the main cabin door triggers the network node 36 to send a signal to the remote computer 10. The remote computer 10 scrambles the existing pass codes for that aircraft and then generates and files a new, encrypted pass code. At this point, the remote computer activates CAPS for the aircraft.

During flight, the pilot views the monitor 32 to ensure that the galley area 40 is clear and contacts the flight attendant to secure the galley door 44. Once the galley door 44 is closed and locked, sensors on the galley door send a signal to the node 36 indicating the locked condition. The pilot then may open the cockpit door 38. After exiting, the cockpit door is locked and closed. Once in the galley are 40, the pilot is free to use the facilities in the galley. When the pilot wishes to return to the cockpit, the pilot notifies the copilot within the cockpit. The copilot inside the cockpit views the cockpit monitor 32 to insure that the galley area 40 is secure. The copilot releases the lock on the cockpit door 38 and the pilot in the galley 40 enters the cockpit 30 and closes the cockpit door 38. The cockpit door 38 automatically locks. The pilot signals a flight attendant that it is now safe to open the galley door 44. When opened, sensors 42 on the galley door 44 send a signal to the node 36 indicating the open condition of the galley door 44.

Upon a security breach, the remote computer 10 scrambles all pass codes for CAPS activated aircraft. Also, the remote computer 10 sends a signal to the node 36 located on the aircraft experiencing the security breach of a locked cockpit. Security breach can occur under such conditions as the galley door 44 and cockpit door 38 being opened simultaneously. Pilots on the aircraft experiencing a security breach cannot open the cockpit until the ground control determines that it is safe to do so or upon deactivation of CAPS.

In the event of a false security breach, an authorized flight personnel contacts ground control through the two-way radio 48. The crew member must explain the events causing the false security breach and request that the auto-lock of the cockpit door 38 be released. Ground control must verify that the individual is both authorized and not acting under duress. Ground control is able to view the galley area through the video feed of the camera 34. Ground control must complete a checklist to verify that no security threat exists before releasing the auto-lock of the cockpit door 38. Only ground control can release the auto-lock on the cockpit door that is initiated by a security breach.

There is a mechanism for emergency access to a cockpit. This procedure is conducted only when the connection between the aircraft node 36 and remote computer 10 is broken and for that reason the auto-lock on the cockpit door 38 cannot be overridden. For the emergency access, an authorized crew member contacts ground control to alert ground personnel of the situation and request the pass code. Ground control must verify that the individual is authorized and not acting under duress. Upon doing so, ground control provides a pass code to the authorized crew member. The crew member enters the pass code onto the keypad 46 allowing the crew member to open the cockpit door and to remedy the emergency situation.

Upon arrival, CAPS is deactivated by the pilot completing a standard arrival checklist. When the main cabin door 41 opens, the sensors on the cabin door trigger the node 36 to send a signal to the remote computer. The nodes send the signal. This signal deactivates CAPS on the aircraft and the remote computer scrambles the existing pass code for the aircraft and deactivates CAPS for the aircraft.

Figure 3:
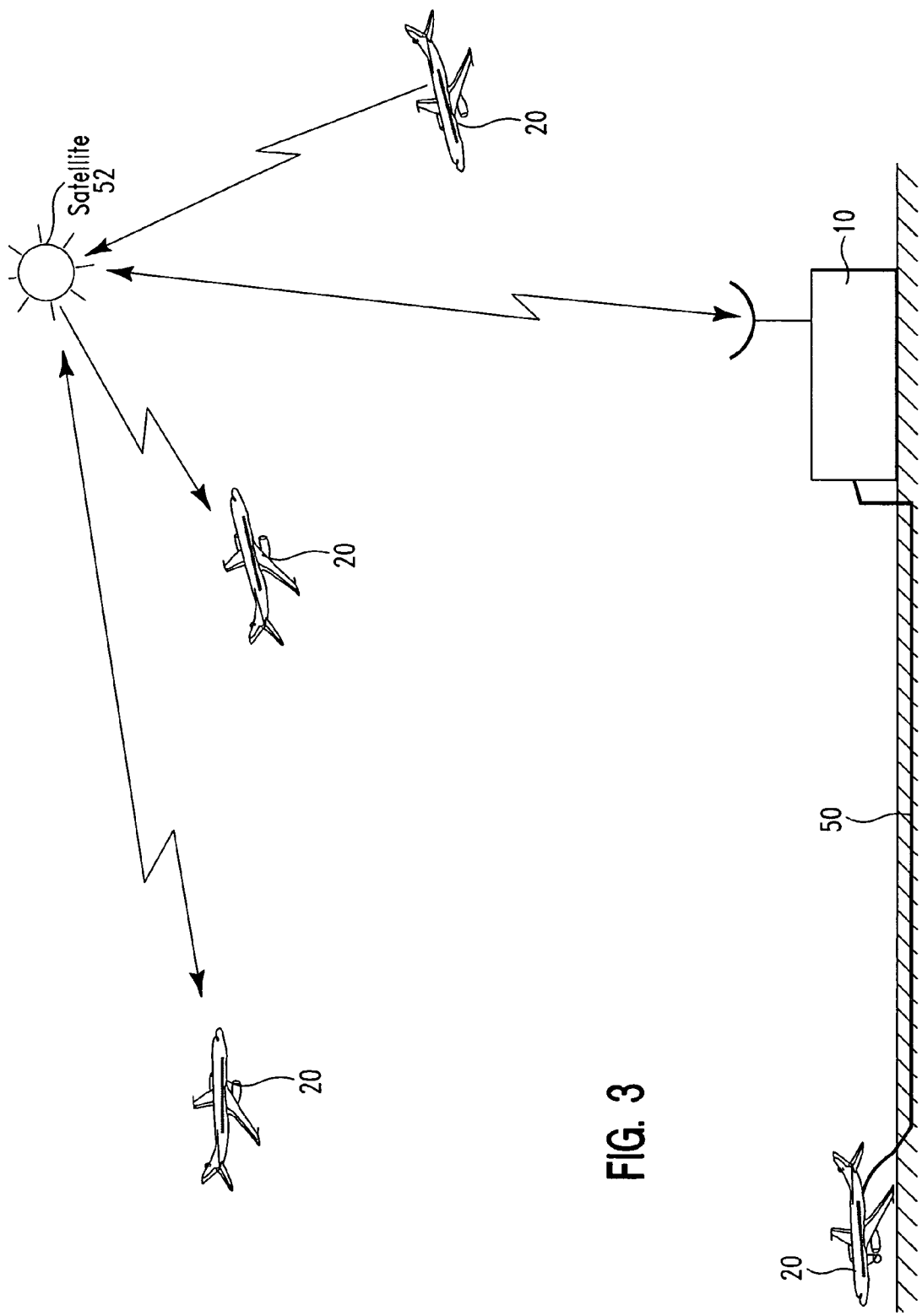
FIG. 3 is a representational diagram illustrating the communication between a ground control center and a plurality of aircraft, both in flight and on the ground.

FIG. 3 is a more detailed diagram indicating how a single ground control center 10 controls a plurality of CAPS equipped aircraft both in flight and on the ground. Communication between the control center and aircraft at various airports on the ground is via the ground communication network 50. Communication between the control center 10 and aircraft 20 in flight is via satellite 52 which relays the two-way digital and voice communication.

The method according to the present invention for securing cockpit access is set forth in detail in FIGS. 4A–4D. This method is divided into separate segments: FIG. 4A details the preflight procedure; FIG. 4B details the normal security procedures which are carried out while the aircraft is airborne; FIG. 4C details procedures for entering the cockpit in the case of a cockpit emergency, when the aircraft is airborne; and FIG. 4D details the procedure in the event of a security breach. The left side of each figure details what happens at the ground control center, whereas the right side of each figure details what happens on the aircraft.

As FIG. 4A shows, members of the flight crew (pilot, copilot and flight attendants) log on and enter their personal identification numbers into the keypad 46 in the galley area 40 of the aircraft. This information is transmitted to the control center 10 for later use in verifying the identities of these authorized flight personnel.

Thereafter, the flight crew closes and locks the main cabin door and transmits the locked status of the door to the control center. The personal IDs and the locked status of the main cabin door are transmitted to ground which, in turn, activates the cockpit access protection system CAPS on the aircraft. In addition, the control center creates and transmits to the aircraft a unique alphanumeric code which may later be used in the case of an in flight cockpit emergency.

Finally, the pilot or copilot closes the cockpit door and it locks automatically. Since the door can only be opened from the inside, only the pilot and copilot can open this door. The locked status of the cockpit door is also transmitted to the ground control center.

FIG. 4B details how a pilot or copilot, who normally sit in the cockpit, can leave the cockpit and enter the galley area while preserving security on the aircraft. At first, flight attendants clear the galley area of passengers (unauthorized personnel). Thereafter, the flight crew closes the galley door and it locks automatically. Since it can only be opened from the inside, the passengers have no access to the galley area. The pilot or copilot can confirm that the galley door is locked by means of the sensors 42.

Next, the pilot who would like to enter the galley area unlocks the cockpit door and leaves the cockpit. The cockpit door is closed behind him and it locks again automatically. The pilot attends to his personal business (joining the flight attendants in cup of coffee or the like) and then knocks on the cockpit door. The copilot inside the cockpit views the galley area with the aid of the monitor 32 and video camera 34. If the galley area is clear of unauthorized personnel, the copilot unlocks the cockpit door and allows the pilot to reenter the cockpit. Thereafter, the pilot closes the cockpit door and it locks automatically. At this point, the flight crew can unlock the galley door from the inside to allow passengers to enter the galley. The galley door may also be unlocked automatically, when the cockpit door is locked, making it unnecessary for a crew member to be present in the galley.

FIG. 4C details the procedure in case of a cockpit emergency, such as a medical emergency, fire in the cockpit or the like, wherein neither the pilot nor the copilot can unlock the cockpit door to allow the flight crew to enter. In this case, the flight crew clears the galley area of passengers (unauthorized personnel) and closes and locks the galley door. Thereafter, the flight crew uses the two-way radio 48 to inform the ground of the nature of the emergency and tells the control center attendant their personal identification numbers. The control center checks these identification numbers to verify the identity of one or more of the flight personnel, and makes a judgment as to whether there has been a breach of security. This judgment is based upon the fact that the identification numbers are correct. If they were incorrect, the control center would be alerted to the breach of security.

Upon verification of the identities of the flight crew, the control center informs the flight crew of the alphanumeric code. The flight crew enters this code into the keypad 48 in the galley, causing the cockpit door to become unlocked. Thereafter, the flight crew may enter the cockpit and deal with the emergency.

FIG. 4D details the procedure in the event of a security breach. The security breach may be discovered either by the control center, for example from an erratic or unexplained flight maneuver of the aircraft, or by the flight crew in the aircraft. When a security breach is discovered, either at the control center or in the aircraft, a security breach alert is transmitted between the control center and the aircraft so that both locations are aware of the security breach. When this occurs, cockpit and galley door sensor information and flight recorder information are transmitted to the control center. In turn, the control center scrambles the alphanumeric codes for all CAPS activated aircraft and transmits these codes to all such aircraft. The aircraft receive and store these new alphanumeric codes so that, if one had been previously transmitted to an aircraft, the flight personnel could no longer enter the cockpit.

In addition, the control center transmits a command to secure the locks on the main cabin door and cockpit door on all CAPS activated aircraft. When this occurs, the main cabin door and cockpit door cannot be unlocked by anyone on the aircraft, even the pilot and copilot.

After the security breach, the pilot of the aircraft is directed to land at an appropriate airport. Until the alert is cleared, the main cabin door and the cockpit door on all CAPS activated aircraft remain locked by the control center.

Finally, when each CAPS activated aircraft is safely on the ground, the control center transmits a command to unlock the main cabin door. This cabin door can therefore be opened from the outside to allow police to enter the aircraft and deal with the security breach. After the security breach has been cleared, the control center transmits a command to unlock the cockpit door of each CAPS activated aircraft so that the pilot and copilot of each aircraft can leave the aircraft.

There has thus been shown and described a novel cockpit access protection system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for securing a plurality of aircraft, each aircraft having a fuselage cabin with a cockpit, a galley area, adjacent to said cockpit, a main cabin door to the outside, a cockpit door and a galley door, separating the cockpit and galley respectively from the remaining portion of the cabin, said method comprising the steps of:
   (a) prior to flight of an aircraft, allowing authorized persons to enter the cockpit;
   (b) prior to or during flight of the aircraft, closing and locking the cockpit door to prevent access to the cockpit by unauthorized personnel from the remaining portion of the aircraft cabin;
   (c) during flight of the aircraft, removing unauthorized personnel from the galley area;
   (d) thereafter closing and locking the galley door to prevent access to the galley by unauthorized personnel from the remaining portion of the aircraft cabin;
   (e) thereafter unlocking said cockpit door and allowing authorized personnel into the galley area from the cockpit;
   (f) closing and locking said cockpit door;
   (g) thereafter unlocking said cockpit door and allowing authorized personnel to reenter said cockpit;
   (h) thereafter closing and locking said cockpit door to prevent access to the cockpit by unauthorized personnel;
   (i) thereafter unlocking said galley door and allowing unauthorized personnel into the galley area;
   (j) repeating steps (c)–(i) whenever the pilot needs to leave the cockpit during flight;
   (k) in the event of a security breach on the aircraft, transmitting an alert between a ground control center and the aircraft; and
   (l) transmitting a command from the control center to each of said plurality of aircraft to prevent unlocking of said cockpit door of each aircraft.

2. The method of claim 1, further comprising the step of informing flight attendants that it is allowable to unlock the galley door after said authorized personnel have reentered the cockpit and the cockpit door has been locked.

3. The method of claim 1, wherein said cockpit door includes at least one sensor for indicating when this cockpit door is closed and locked.

4. The method of claim 1, wherein said galley door includes at least one sensor for indicating when this galley door is closed and locked.

5. The method of claim 1, wherein said aircraft has a network node for communicating with the control center and further comprising the step of sending a signal to said network node in said aircraft indicating when at least one of said cockpit door and said galley door is locked.

6. The method of claim 1, further comprising the step of verifying the identities of the authorized personnel before allowing said authorized personnel to reenter the cockpit.

7. The method of claim 1, wherein the aircraft includes means in the galley area for authorized personnel to enter an alphanumeric code and means responsive to the entered code for unlocking the cockpit door, said method further comprising the step of generating the alphanumeric code in said control center and transmitting said code to said aircraft prior to or during flight.

8. The method defined in claim 7, further comprising the step of verifying the identity of authorized flight personnel at the control center and informing said flight personnel of the alphanumeric code, thereby allowing them to unlock the cockpit door from the galley area side and enter the cockpit.

9. The method of claim 7, further comprising the step of changing the alphanumeric code previously transmitted to each of said plurality of aircraft in flight and transmitting a new alphanumeric code to each of said plurality of aircraft in the event of a security breach in one of said aircraft.

10. The method of claim 1, further comprising the step of transmitting a command from the control center to each of said plurality of aircraft to prevent unlocking of said main cabin door of each aircraft.

11. The method of claim 1, further comprising the step of allowing the unlocking of said cockpit door by authorized personnel in the cockpit after verifying that no security breach exists.

12. The method of claim 11, further comprising the step of verifying that no security breach exists by communicating between said aircraft and said control center.

13. The method of claim 10, further comprising the step of allowing the unlocking of said main cabin door by authorized personnel in the galley area after verifying that no security breach exists.

14. The method of claim 1, wherein the aircraft has a video camera in the cabin for producing a live video signal and wherein said method further comprises the step of transmitting the live video signal from the aircraft to the control center in the event of a security breach.

15. The method of claim 3, further comprising the step of transmitting the indication of the cockpit door sensor from the aircraft to the control center in the event of a security breach.

16. The method of claim 1, wherein the aircraft has a flight recorder for recording current flight information and wherein said method further comprises the step of transmitting the current flight information from the aircraft to the control center in the event of a security breach.

* * * * *